Oct. 14, 1947.  O. GERBES  2,429,125
CATALYTIC PROCESS FOR TREATING HYDROCARBONS WITH A METALLIC HALIDE
Filed May 12, 1944
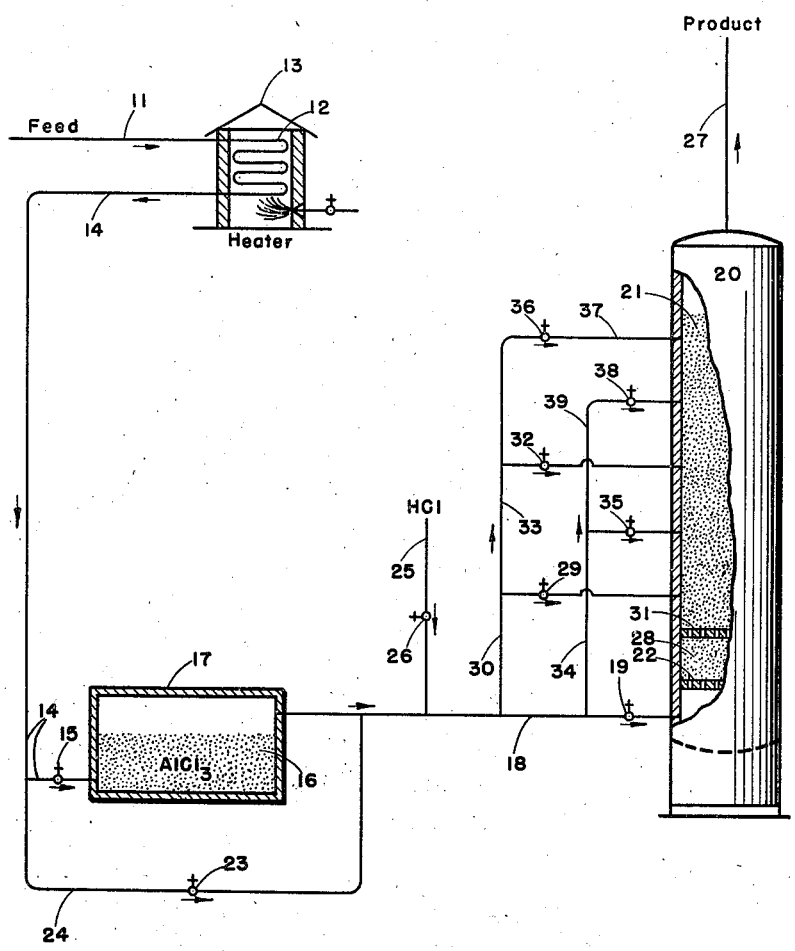
Otto Gerbes INVENTOR.
BY
J. G. McKean
ATTORNEY.

UNITED STATES PATENT OFFICE 2,429,125

CATALYTIC PROCESS FOR TREATING HYDROCARBONS WITH A METALLIC HALIDE

Otto Gerbes, Goose Creek, Tex., assignor to Standard Oil Development Company, a corporation of Delaware Application May 12, 1944, Serial No. 535,309

5 Claims. (Cl. 260—683.5)

The present invention is directed to processes in which a volatilizable metal halide carried on an adsorptive support is employed to catalyze a vapor phase reaction. More particularly, the invention is concerned with an isomerization process in which a volatilizable metal halide adsorbed on a support is employed to catalyze the reaction in the vapor phase.

In a vapor phase reaction of the general type referred to above, such as isomerization, where make-up of aluminum halide is effected by sublimation into a gaseous or vaporous stream entering the bottom of a reaction zone containing a porous adsorbent, such as bauxite, impurities continuously or periodically present in the fresh feed accumulate in the bottom section of the bauxite bed. These impurities which may be olefins, hydrocarbons heavier than the fresh feed, and oil which is employed to seal the pumps, and other extraneous materials are very reactive with the aluminum halide catalyst forming a tarry aluminum halide complex with these compounds which has a high capacity for absorption of additional aluminum halide. Under these conditions it is not possible to obtain complete utilization of the make-up halide, since a part or all of the sublimed aluminum halide may be absorbed by the feed stock impurities or the tarry aluminum halide complex which accumulates in the bottom of the adsorptive bed. The high absorptive capacity of the aluminum halide reaction products prevents adsorption of the aluminum halide by the bauxite and thus does not allow the obtaining of an active catalyst.

Vapor phase isomerization processes, which are usually catalyzed by an aluminum halide deposited on a porous support, are very sensitive to the purity of the feed stock. If, as mentioned above, the hydrocarbon feed stock contains a small quantity of extraneous material, it is often necessary to resort to expensive purification processes, such as fractionation and drastic chemical treatment. In the present process, while it is desirable to have a substantially pure feed stock, a method is provided whereby the feed stocks may be purified during the reaction, and substantially complete utilization of the porous adsorbent may be obtained. Heretofore the tarry aluminum halide complexes which accumulated in the pores of the adsorption bed resulted in the bed becoming fouled with these reaction products which prevented its utilization after varying lengths of onstream periods.

Prior investigators have recognized that a substantially pure feed is required in a vapor phase isomerization process employing a metal halide as a catalyst. Thus, the prior art workers have disclosed treatment of feed stocks with mineral acids, aluminum chloride, porous adsorbents, and even with a portion of the catalyst bed farthest removed from the point of entry of the feed thereto. While the prior investigators recognized the deleterious effects of buildup of tarry aluminum halide reaction products in the porous adsorbent, I have now discovered that advantage may be taken of the tarry complex as a treating medium for the feed. The tarry reaction products of the metal halide are usually formed in the first 10 or 20 per cent of the porous adsorbent bed, leaving the rest of the bed substantially free of these reaction products. I have discovered that the remaining 80 to 90 per cent of the porous adsorptive bed may be utilized effectively as a support for aluminum halide. I have also discovered that the tarry reaction products accumulating in the lower-most section of the porous adsorptive bed in a vapor phase process of the general type referred to, while inert with respect to catalytic activity in isomerizing hydrocarbons, retains considerable activity with respect to other reactions. Thus, I have discovered that if the feed stock is passed through this section of the bed and the aluminum chloride is by-passed around the section of the bed which is fouled with reaction products, an improved result is obtained with respect to feed purity and to lengthened life of the catalyst bed.

The present invention, while applicable to any vapor phase catalytic reaction employing a volatilizable metal halide as the catalyst, has particular application to paraffin isomerization processes in which hydrocarbons are isomerized by being passed in a superheated vapor phase condition over bauxite or other similar adsorptive support impregnated with aluminum chloride or other similar active metal halide. The reaction mixture is usually maintained between about 200° and 350° F., and the pressure in the reaction chamber is adjusted to avoid condensation of the hydrocarbons therein. A pressure of the order of about 250 pounds per square inch is usually sufficient. Ordinarily there is intermingled with the hydrocarbon vapors a promoter such as hydrogen chloride which is continuously removed from the reaction product and recycled to the reaction zone. The product is subjected to alternate steps of condensation and fractionation for the recovery of the desired components and recycling of unconverted components.

In one specific embodiment of the present invention the paraffin hydrocarbon, for example, normal butane, is vaporized, mixed with promoter and passed upwardly through a porous adsorbent body impregnated with an aluminum halide, such as aluminum chloride. By passage through the bed under suitable conditions of temperature and pressure, such as, for example, 200° to 350° F., and pressures adjusted to avoid condensation, substantial conversion of the paraffin hydrocarbon to isoparaffin is effected. The reaction products pass outwardly from the catalytic zone and the isomerized product and the promoter are separately recovered and the promoter recycled to the feed with unreacted hydrocarbon. After a period of onstream operation, it will be noted that it becomes increasingly difficult to maintain the catalytic effect of the porous bed by introduction either continuously or periodically of additional aluminum chloride onto the porous support. It is well known to conduct this addition of metal halide to the porous bed by sublimation, a portion of the vaporized feed in a heated condition usually being passed through a body of the metal halide prior to passage to the porous bed. When it is observed that additions of aluminum halide effect no great increase in catalytic activity, I by-pass the lower-most section of the porous adsorbent bed, which is usually the lower 10 or 20 per cent of the bed, and add the aluminum chloride to the upper 80 or 90 per cent of the porous bed. I have found by this expedient I am able to utilize completely the porous adsorbent in making an active isomerization catalyst. Following the addition of aluminum halide to the unaffected portion of the adsorbent bed, I then pass the vaporized feed hydrocarbon again through the complete porous bed, utilizing the fouled portion thereof as a treating section. The feed stock impurities usually comprise seal oil, olefins, normal pentane and other heavy hydrocarbons, and even traces of alkyl esters and sulfuric acid, when the feed stock is obtained from a sulfuric acid alkylation process. Just what reactions occur between the aluminum chloride sludge and the feed stock impurities are not known, but it is believed that this sludge does not efficiently catalyze the vapor phase isomerization reaction. It is postulated that these reactions in the lower-most section of the porous bed which contains the accumulated aluminum chloride sludge comprise condensation, polymerization, and other reactions between the sludge and the impurities.

For a more specific description of my invention, reference is now made to the single figure which is a front elevation in partial section of apparatus for conducting a preferred embodiment of the invention. Referring now to the drawing, numeral 11 designates a feed line carrying a paraffin hydrocarbon, for example normal butane, which is introduced into coil 12 located in heater 13 whereby the normal butane is heated to a temperature sufficient to maintain a temperature between about 200° and 350° F. in the reaction zone which will be described. The vaporous normal butane discharges from coil 12 into line 14 controlled by valve 15 and passes upwardly through a body of aluminum chloride 16 in vessel 17. The aluminum chloride is sublimed and carried by the vaporous normal butane and discharges from vessel 17 into line 18 controlled by valve 19 and enters reaction zone 20 which is provided with a porous bed 21 supported on a grid plate 22. Porous bed 21 may be an activated bauxite or other similar adsorbent which is capable of adsorbing the aluminum chloride carried by the vaporized normal butane. The combination of the porous support and aluminum chloride forms an active isomerization catalyst. After porous bed 21 has become impregnated with aluminum chloride, valve 15 in line 14 is closed off and valve 23 in line 24 is opened, allowing the vaporized normal butane to by-pass vessel 17 and to enter reaction zone 20. To promote the isomerization reaction a promoter, such as anhydrous hydrogen chloride, is introduced intermittently or continuously to line 18 through line 25 controlled by valve 26. It is important that addition of hydrogen chloride be omitted while aluminum chloride is being added to the zone 20. On passage of the vaporized normal butane through the bed 21 in reaction zone 20 the normal butane is converted in substantial amounts to isobutane and issues therefrom to line 27 for recovery of the isomerized product and unused promoter gas. Since the recovery of the isomerized product and the promoter gas does not form an integral part of the present invention, further reference thereto will not be made.

The normal butane fed to the system by way of line 11 ordinarily contains small quantities of olefins, heavy hydrocarbons, such as normal pentane, in the case where normal butane is the feed, and seal oil in amounts ranging from about 2 per cent to a fraction of 1 per cent and even as little as $\frac{1}{10}$ of 1 per cent or less. These feed stock impurities, while only a small quantity of the total feed, result in serious fouling of the bed 21 by reaction with the aluminum chloride in the lower portion thereof designated as section 28. After these feed stock impurities have reacted for a sufficient period of time with the aluminum chloride, there is usually built up in section 28 of the bed 21 a zone containing aluminum chloride reaction products, which is a tarry mass believed to be substantially inert as regards the vapor phase isomerization reaction. These tarry reaction products have a high absorptive capacity for aluminum chloride; and when efforts are made to reactivate the bed 21 by introduction of aluminum chloride from vessel 17 through line 18 and valve 19, it was observed that substantially all of the aluminum chloride was absorbed in the section 28 and very little catalytic effect was obtained thereby.

I have, therefore, provided in my invention means for by-passing section 28 of the porous bed 21 to allow utilization of the remaining unaffected portions of the bed 21. To this end, valve 19 is closed off and valve 29 in branch line 30 is opened, allowing by-passing of section 28 of bed 21, thus providing an active catalyst by addition of aluminum chloride to the porous bed 21 for the isomerization of additional amounts of normal butane. Subsequent to the introduction of aluminum chloride to the remaining portion of bed 21 unaffected by the reaction products of aluminum chloride and the feed stock impurities, I then close off valve 29 in line 30 and reopen valve 23 in line 24 and valve 19 in line 18 and close off valve 15 in line 14, allowing the vaporized butane to pass again upwardly through reaction zone 20. By operating in this particular way it is possible to free the feed stock of impurities by passage of the hydrocarbon feed through section 28 of bed 21 while utilizing the remaining portion of bed 21 as an isomerization catalyst. It is thus possible to remove substantially all the feed stock impurities and to utilize completely the porous adsorbent as a catalyst support.

From time to time it may be necessary to reactivate section 28 of bed 21 by addition of small amounts of aluminum chloride thereto. Thus, it is contemplated to be within the scope of the present invention to inject periodically small quantities of aluminum chloride into the bottom section of zone 20 to restore the treating effect of section 28.

It is also contemplated that, as the porous bed 21 gradually accumulates reaction products above point 31, which in this instance may be a grid plate similar to grid plate 22, I may introduce make-up aluminum chloride in a plurality of points in bed 21. For example, a portion of the bed 21 immediately above grid plate 31 may eventually become filled with products of reaction of aluminum chloride with the feed stock impurities, and in these cases I open valve 32 in branch line 33 when it is desired to introduce make-up aluminum chloride into the remaining unaffected portions of the bed 21. In these instances, when the bed is becoming progressively fouled with reaction products, it may be desirable to close off completely valve 19 and to route the feed hydrocarbons through line 34 controlled by valve 35. Similarly, make-up aluminum chloride may be introduced into the upper-most portion of bed 21 by opening valve 36 in line 37, and vaporized feed hydrocarbons may be introduced further up into the tower by opening valve 38 in line 39.

It may thus be seen that my improved process is susceptible to flexible operation to allow substantially complete utilization of the porous bed 21 and to allow substantially complete removal of impurities from the feed stock. The only time any feed stock impurities are introduced into the bed 21 above section 28 is during the time when make-up aluminum chloride is being sublimed into the upper-most section. It will thus be seen that the vaporized normal butane carrying the aluminum chloride will also contain the feed stock impurities. Since it is during only about 10 per cent of the operating time that make-up aluminum chloride is introduced, my improved process allows about 9 times longer operating life for the catalyst than was possible heretofore and also allows substantially complete utilization of the porous bed 21. By introducing the make-up aluminum chloride by passage of heated inert gas such as methane, nitrogen and the like, through vessel 17 containing aluminum chloride by means not shown, it may be seen that the bed 21 may be kept substantially free of the feed stock impurities which cause the reaction products to accumulate in section 28 at the outset of the reaction. It is preferred, however, to employ the vaporized feed hydrocarbon as the carrying agent for the sublimed aluminum chloride since isomerization is effected during these make-up periods to some extent, while if an inert gas were employed, no isomerization would be obtained. Thus, while feed stock impurities will accumulate in the lower portions of bed 21 during the make-up of aluminum chloride thereto, isomerization continues; and, therefore, it is preferred to employ the vaporized feed stock as the carrying agent for the aluminum chloride even though some impurities are introduced thereby.

It will be realized by those skilled in the art that the portion of the adsorbent bed 21 designated as section 28 will become fouled with aluminum chloride reaction products only gradually as the reaction proceeds. However, it is within the spirit and scope of the present invention to form deliberately a section 28 by injecting with the feed hydrocarbon amounts of impurities substantially greater than the amounts normally contained in the feed. This is a less desirable procedure than the preferred embodiment since by letting the zone 28 gradually build up, aluminum chloride consumed by the feed stock impurities does result to some extent in production of isoparaffins while forming the section 28, while otherwise the aluminum chloride needed to form the section 28 by deliberately injecting substantial amounts of impurities with the feed would be consumed in nearly its entirety in forming the section 28. Therefore, this is an alternate but less desirable procedure to employ than that described.

Another method for conducting the present invention and which will allow substantially complete utilization of the porous bed 21 is to by-pass the lower-most sections of the bed which contain the fouling deposits by closing off valve 19 and introducing the hydrocarbon feed into the bed 21 either by way of valve 29 and line 30, valve 32 and line 33, or valve 36 and line 37, depending on the extent of buildup of the fouling deposits in the bed. It will be realized by those skilled in the art that this also is an alternate but less desirable procedure since the treating effect of the fouling deposit for removing feed stock impurities is lost when proceeding in accordance with the last described alternate method.

In order to illustrate further the beneficial effects of proceeding in accordance with the present invention a commercial vapor phase isomerization process, in which a reactor zone similar to zone 20 was employed containing a bed of porous material 21, after a period of on-stream operation, the bed 21 resisted further efforts to reactivate it by introduction of sublimed aluminulm chloride through line 18. Valve 19 was closed off and make-up aluminum chloride was introduced into the upper-most section of bed 21 by opening valve 29 in line 30. It was found that it was possible to reactivate the bed 21 and to allow isomerization to proceed. During a 24-hour period after make-up aluminum chloride had been added through line 30 as described, reaction zone 20 produced a total of 1,700 barrels of isobutane, representing a conversion of 44.0 per cent on the normal butane charge, while for the 24-hour period prior to the introduction of make-up aluminum chloride through line 30 as described only 600 barrels of isobutane had been produced. It is understood, of course, that when the 1,700 barrels of isobutane were produced during the 24-hour period, the feed hydrocarbon was introduced through line 18 and passed through the equivalent of section 28 of bed 21.

The nature and objects of the present invention having been described and fully illustrated, what I wish to claim as new and useful and to secure by Letters Patent is:

1. A method for treating hydrocarbons comprising the steps of providing a porous mass capable of adsorbing a metallic halide, depositing metallic halide on a lower portion of said porous mass, passing upwardly through said mass a hydrocarbon feed stock in superheated vaporous form and comprising at least a portion capable of reacting with the metallic halide to form a sludge, said feed stock coming first in contact with that portion of the mass on which the metallic halide is deposited and subsequently flowing upwardly through the remainder, continuing the flow of said feed stock through the adsorbent mass until substantial amounts of sludge are formed in that portion having metallic halide deposited thereon, introducing additional metallic halide into a portion of the mass different from that in which the metallic halide was first introduced and in which the sludge has formed and subsequently passing said feed stock in vaporous form first through that portion of the mass in which the sludge has been formed and subsequently through that portion of the mass upon which the additional metallic halide has been deposited.

2. In the treatment of a hydrocarbon feed stock comprising a major portion of normal paraffin and a minor portion of impurities capable of reacting with metallic halide to form a sludge more readily than the normal paraffin comprising the steps of arranging a porous mass to define a first elongated path of flow including at least a major portion of the mass and a second elongated path of flow including a portion of the first path of flow but avoiding at least an initial portion of the first path of flow, passing a metallic halide in vaporous form into the porous mass along the first path of flow and maintaining the porous mass in such a condition as to cause at least a major portion of the metallic halide to deposit in that portion of the mass included in the first path of flow but avoided by the second path of flow, subsequently passing the hydrocarbon feed stock through the porous mass along the first path of flow under conditions to cause the isomerization of a substantial portion of the normal paraffin and the formation of sludge by the reaction of impurities with the metallic halide deposited on the porous mass, introducing additional metallic halide in vaporous form into the porous mass along the second path of flow and maintaining the porous mass in such a condition as to cause the deposition of a major portion of the metallic halide in said mass and subsequently passing additional feed through the porous mass along the first path of flow.

3. A method for treating hydrocarbons comprising the steps of arranging a porous mass to define an elongated first path of flow and a second elongated path of flow including a portion of the first path of flow but avoiding a first portion of the first path of flow, introducing via the first path of flow a metallic halide in vaporous form while maintaining the mass under such conditions as to deposit at least a major portion of the metallic halide in the mass along that portion of the first path of flow avoided by the second path of flow, subsequently passing along the first path of flow a hydrocarbon mixture comprising a substantial amount of material capable of reacting with the metallic halide to form a sludge in the porous mass, terminating the flow of said hydrocarbon mixture, introducing additional metallic halide in vaporous form into the mass along the second path of flow and subsequently passing through the porous mass along the first path of flow a hydrocarbon mixture including a major portion of normal paraffin and a minor portion of material capable of reacting readily with the sludge previously formed in the mass.

4. In the treatment of a hydrocarbon feed stock comprising a major portion of normal paraffin and a minor portion of impurities capable of reacting with metallic halide to form a sludge more readily than the normal paraffin comprising the steps of arranging a porous mass to define a first elongated path of flow including at least the major portion of the mass and a second elongated path of flow including a portion of the first path of flow but avoiding at least an initial portion of the first path of flow, passing a metallic halide in vaporous form through the porous mass through the first path of flow and maintaining the porous mass in such a condition as to cause the deposition of at least a major portion of the metallic halide in that portion of the mass included in the first path of flow but avoiding by the second path of flow, subsequently passing the hydrocarbon feed stock through the porous mass along the first path of flow under conditions to cause the isomerization of a substantial portion of the normal paraffin and the formation of a sludge by the reaction of impurities with metallic halide deposited on the porous mass, subsequently terminating the flow of the hydrocarbon feed, introducing additional metallic halide in vaporous form into porous mass along the second path of flow and subsequently passing additional feed through the porous mass along the second path of flow.

5. A method for isomerizing a feed stock comprising a major portion of normal butane and a minor portion of heavier hydrocarbons more reactive with metallic halide than the normal butane comprising the steps of arranging bauxite in an elongated vessel provided with an outlet and at least a first and a second inlet with the first path of flow through the bauxite from the first inlet to the outlet including at least a major portion of the bauxite and a second path of flow through the bauxite from the second inlet to the outlet including a portion of the first path of flow but avoiding a portion of bauxite adjacent the first inlet, heating the feed stock to a temperature in the range of 200° to 350° F., passing said heated feed stock through aluminum chloride to sublime at least a portion thereof and passing a mixture of hydrocarbon vapors and sublimed aluminum chloride into the vessel via the first inlet and depositing at least the major portion of the aluminum chloride on the porous mass adjacent the first inlet, subsequently passing the hydrocarbon feed stock in admixture with a promoter through the vessel from the first inlet to the outlet while maintaining the temperature in the vessel in the range of 200° to 350° F. to cause the isomerization of a substantial portion of the normal butane and to form a sludge adjacent the first inlet, subsequently heating additional feed stock to a temperature in a range of 200° to 350° F., passing said heated feed through aluminum chloride to sublime at least a portion thereof and passing the mixture of hydrocarbon feed and aluminum chloride into the second inlet and depositing at least the major portion of the aluminum chloride adjacent the second inlet, subsequently passing hydrocarbon feed stock heated to a temperature in the range of 200° to 350° F. through the vessel and along the first path of flow through the porous mass between the first inlet and the outlet.

OTTO GERBES.

REFERENCES CITED

The following references are of record in the file of this patent:

UNITED STATES PATENTS

| Number | Name | Date |
| --- | --- | --- |
| 2,289,063 | Ocon et al. | July 7, 1942 |
| 2,310,907 | McMillan | Feb. 9, 1943 |
| 2,366,028 | Henry | Dec. 26, 1944 |
| 2,342,124 | Danforth | Feb. 22, 1944 |